(12) United States Patent
Tsai (10) Patent No.: US 9,244,497 B2
(45) Date of Patent: Jan. 26, 2016

(54) HINGE MODULE AND FOLDABLE DEVICE (71) Applicant: Wistron Corporation, New Taipei (TW)

(72) Inventor: Shao-Huai Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 137 days.

(21) Appl. No.: 14/064,214

(22) Filed: Oct. 28, 2013

(65) Prior Publication Data
US 2015/0009614 A1   Jan. 8, 2015

(30) Foreign Application Priority Data

Jul. 3, 2013   (TW) .............................. 102123851 A (51) Int. Cl.
*E05D 11/10* (2006.01)
*G06F 1/16* (2006.01)

(52) U.S. Cl.
CPC ............ *G06F 1/1681* (2013.01); *G06F 1/1616* (2013.01); *G06F 1/1679* (2013.01); *E05Y 2900/606* (2013.01); *Y10T 16/5401* (2015.01)

(58) Field of Classification Search
CPC ......................... G06F 1/1681; E05Y 2900/606
See application file for complete search history.

(56) References Cited

U.S. PATENT DOCUMENTS

| | | | | |
|---|---|---|---|---|
| 5,125,131 A * | 6/1992 | Leblanc | .......................... | 16/330 |
| 6,233,785 B1 * | 5/2001 | Tanahashi | ....................... | 16/337 |
| 8,943,649 B2 * | 2/2015 | Chen et al. | ....................... | 16/320 |
| 2009/0144934 A1 * | 6/2009 | Kitagawa et al. | ................ | 16/320 |
| 2010/0058557 A1 * | 3/2010 | Wang | .............................. | 16/320 |
| 2010/0071157 A1 * | 3/2010 | Wang | .............................. | 16/297 |
| 2011/0010893 A1 * | 1/2011 | Su | .................................... | 16/382 |
| 2014/0146484 A1 * | 5/2014 | Chen | ............................. | 361/728 |
| 2014/0211380 A1 * | 7/2014 | Tsai | ......................... | 361/679.01 |
| 2015/0000083 A1 * | 1/2015 | Gwin | ............................. | 16/321 |

FOREIGN PATENT DOCUMENTS

| | | |
|---|---|---|
| JP | 2009145927 | 7/2009 |
| TW | M432239 | 6/2012 |

OTHER PUBLICATIONS

"Office Action of Taiwan Counterpart Application," issued on Apr. 20, 2015, with English translation thereof, p. 1-p. 10.

* cited by examiner

*Primary Examiner* — Victor Batson
*Assistant Examiner* — Matthew Sullivan
(74) *Attorney, Agent, or Firm* — Jianq Chyun IP Office (57) ABSTRACT

A hinge module is disposed between a first body and a second body. A first bracket is fixed on the first body to fix a shaft. A second bracket is fixed on the second body and passed through by the shaft, so that the second bracket can be rotated relative to the first bracket. An electromagnet is installed on the shaft. A magnetic element is installed on the shaft, and capable of being attracted or repelled with the electromagnet. At least one of the electromagnet and the magnetic element is capable of being moved along the shaft axially but substantially incapable of being rotated with the shaft as an axis. When the electromagnet is activated, at least one of the electromagnet and the magnetic element is axially moved to press the second bracket to increase a torque of a rotation of the second bracket relative to the first bracket.

32 Claims, 11 Drawing Sheets

HINGE MODULE AND FOLDABLE DEVICE

CROSS-REFERENCE TO RELATED APPLICATION

This application claims the priority benefit of Taiwan application serial no. 102123851, filed on Jul. 3, 2013. The entirety of the above-mentioned patent application is hereby incorporated by reference herein and made a part of this specification.

BACKGROUND OF THE INVENTION

1. Field of the Invention

The invention relates to a foldable device and more particularly, to a hinge module and a foldable device.

2. Description of Related Art

Notebook computers have gradually replaced desktop computers and become a mainstream product in personal computers. A notebook computer usually includes a host base, and a display connected to a lateral side of the host base through a hinge module. When in use, the display can be flipped open relative to a side of the host base so as to output images for users, and the host base is provided with a keyboard and a touch pad for inputting commands to the host base.

With advancements of technologies, the display provided with a touch input function has also become one new feature for the notebook computer. Accordingly, the users can perform the touch input function by using an icon or a graphical user interface (GUI) on the display. However, a cam structure is adopted for increasing a torque or a resistance of the hinge module in a specific state (such as in an auto-lock state or a touch input state). Nevertheless, a wear behavior of the cam structure can shorten lifetime of the hinge module.

SUMMARY OF THE INVENTION

The invention provides a hinge module capable of adjusting a torque thereof which is required for driving.

The invention provides a foldable device having a hinge module capable of adjusting a torque thereof which is required for driving.

A hinge module is provided, and adapted to be disposed between a first body and a second body to facilitate in rotating the second body relative to the first body. The hinge module includes a shaft, a first bracket, a second bracket, an electromagnet and a magnetic element. The first bracket is adapted to be fixed on the first body to fix a shaft. The second bracket is adapted to be fixed on the second body and passed through by the shaft, so that the second bracket is capable of being rotated relative to the first bracket. The electromagnet is directly or indirectly installed on the shaft. The magnetic element is directly or indirectly installed on the shaft, and capable of being attracted or repelled with the electromagnet under the magnetic force of the electromagnet. At least one of the electromagnet and the magnetic element is capable of being moved axially along the shaft but substantially incapable of being rotated with the shaft as an axis, such that when the electromagnet is activated by power, at least one of the electromagnet and the magnetic element is capable of being moved axially to a first position and to press the second bracket to increase a rotational friction, thereby increasing a torsion of a rotation of the second bracket relative to the first bracket.

The invention provides a foldable device including a first body, a second body and a hinge module. A hinge module is adapted to be disposed between the first body and the second body to facilitate in rotating the second body relative to the first body. The hinge module includes a shaft, a first bracket, a second bracket, an electromagnet and a magnetic element. The first bracket is adapted to be fixed on the first body to fix a shaft. The second bracket is adapted to be fixed on the second body and passed through by the shaft, so that the second bracket is capable of being rotated relative to the first bracket. The electromagnet is directly or indirectly installed on the shaft. The magnetic element is directly or indirectly installed on the shaft, and capable of being attracted or repelled with the electromagnet under the magnetic force of the electromagnet. At least one of the electromagnet and the magnetic element is capable of being moved axially along the shaft but substantially incapable of being rotated with the shaft as an axis, such that when the electromagnet is activated by power, at least one of the electromagnet and the magnetic element is capable of being moved axially to a first position and to press the second bracket to increase a rotational friction, thereby increasing a torsion of a rotation of the second bracket relative to the first bracket.

In summary, a combination of the electromagnet and the magnetic element is utilized in the invention for pressing the second bracket relative to the first bracket, so as to increase the torque required for the rotation of the second bracket relative to the first bracket. Further, in the invention, the electromagnet is driven by electricity to solve the wear behavior of the cam structure in conventional art.

To make the above features and advantages of the disclosure more comprehensible, several embodiments accompanied with drawings are described in detail as follows.

DESCRIPTION OF THE EMBODIMENTS

Referring to FIGS. 1A, 1B, 1C, 1D and 1F together, in the present embodiment, a hinge module 100a is adapted to be disposed between a first body 12 and a second body 14 in a foldable device 10. The first body 12 is, for example, a host base of a notebook computer, and the second body 14 is, for example, a display of the notebook computer. The hinge module 100a includes a shaft 110, a first bracket 120, a second bracket 130, an electromagnet 140 and a magnetic element 150. The first bracket 120 is fixed on the first body 12 and has a first shaft hole 120a to be passed through and fixed by the shaft 110. The second bracket 130 is fixed on the second body 14 and has a second shaft hole 130a to be pivotally passed through by the shaft 110, so that the second bracket 130 is capable of being rotated relative to the first bracket 120 with the shaft 110 as an axis. The second bracket 130 has a bearing 132 to be passed through by the shaft 110, and the bearing 132 includes a first lateral side 132a and a second lateral side 132b opposite to each other. The electromagnet 140 is directly or indirectly fixed on a first lateral side 132a of the bearing 132 of the second bracket 130 and telescoped on the shaft 110. The magnetic element 150 having a through via 150a is telescoped on the shaft 110 on a side of the second bracket 130 near the second lateral side 132b of the bearing 132, and the magnetic element 150 is capable of being moved axially within a specific distance between a first position and a second position on the shaft 110 but incapable of being rotated with the shaft 110 as an axis. Therefore, when the electromagnet 140 on another side of the second bracket 130 is activated by power, the magnetic element 150 is moved to the first position to press the second lateral side 132b of the bearing 132 of the second bracket 130 under a magnetic suction force generated by the electromagnet 140. A rotational friction of the second bracket 130 is increased by a tight attachment between the magnetic element 150 and the second lateral side 132b of the bearing 132 of the second bracket 130 in a face-to-face fashion, so as to increase a torsion required for a rotation of the second bracket 130 relative to the first bracket 120.

Figure 1A:
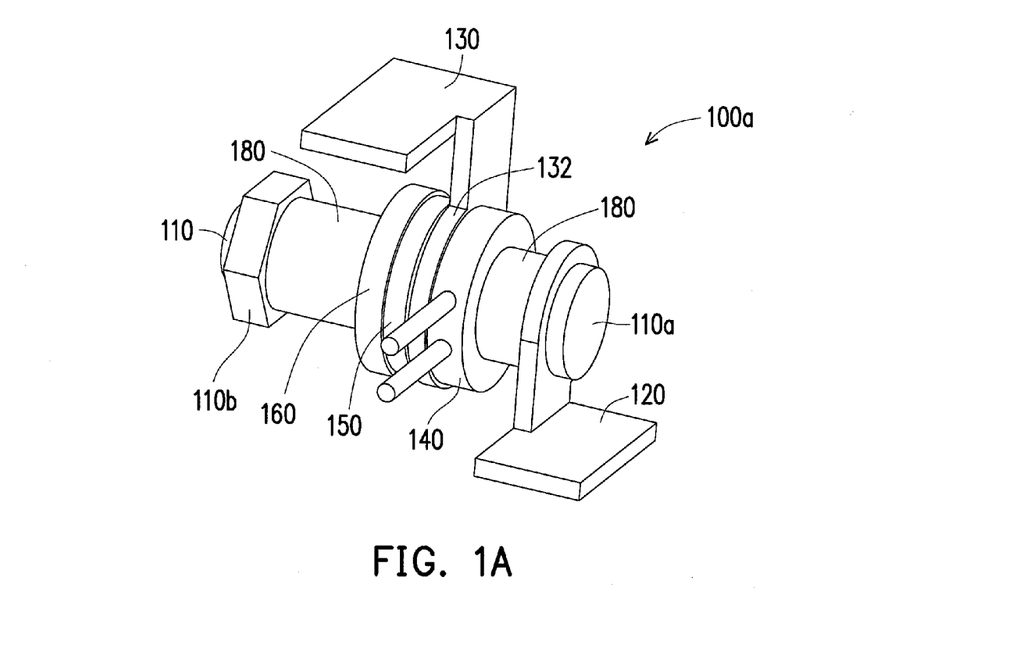
FIG. 1A is a three-dimensional view of a hinge module according to an embodiment of the invention.
Figure 1B:
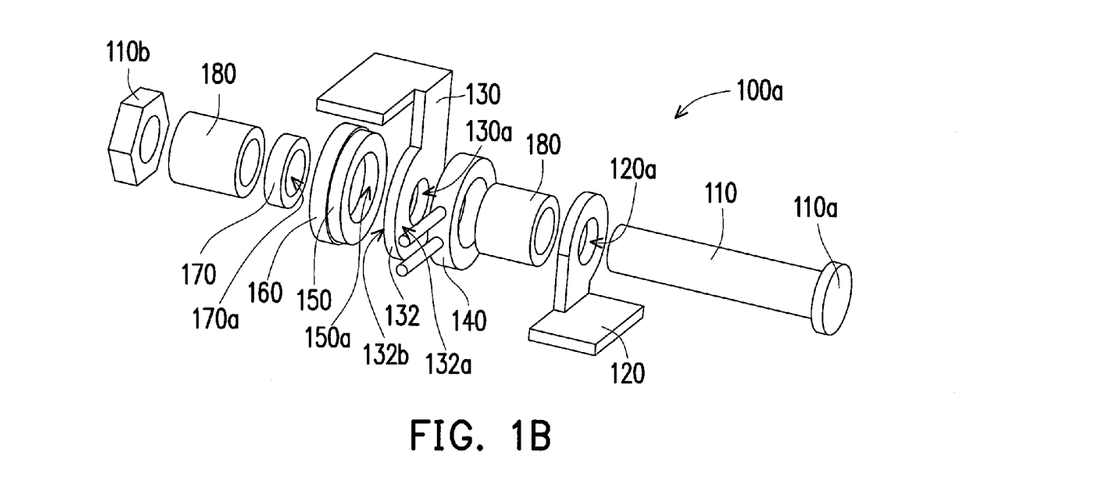
FIG. 1B is a breakdown view of the hinge module depicted in FIG. 1A.
Figure 1C:
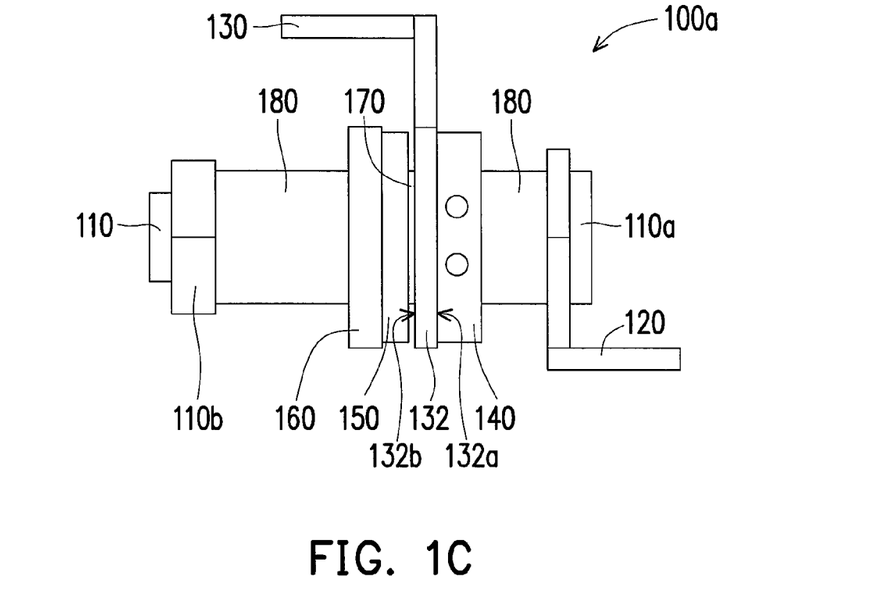
FIG. 1C is a front view of the hinge module depicted in FIG. 1A.
Figure 1D:
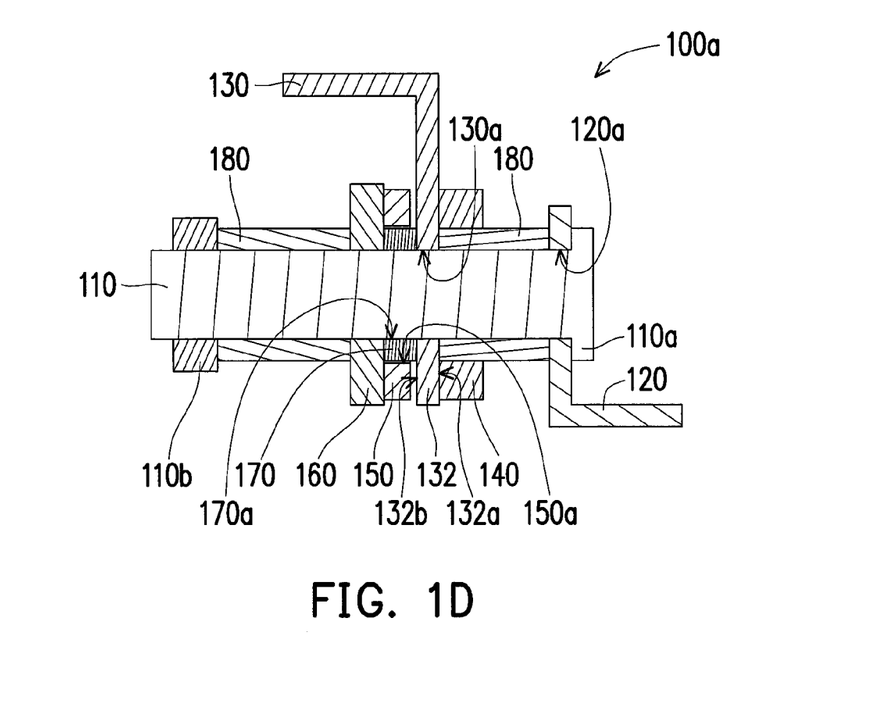
FIG. 1D is a sectional view of the hinge module depicted in FIG. 1A which is not under pressing.
Figure 1E:
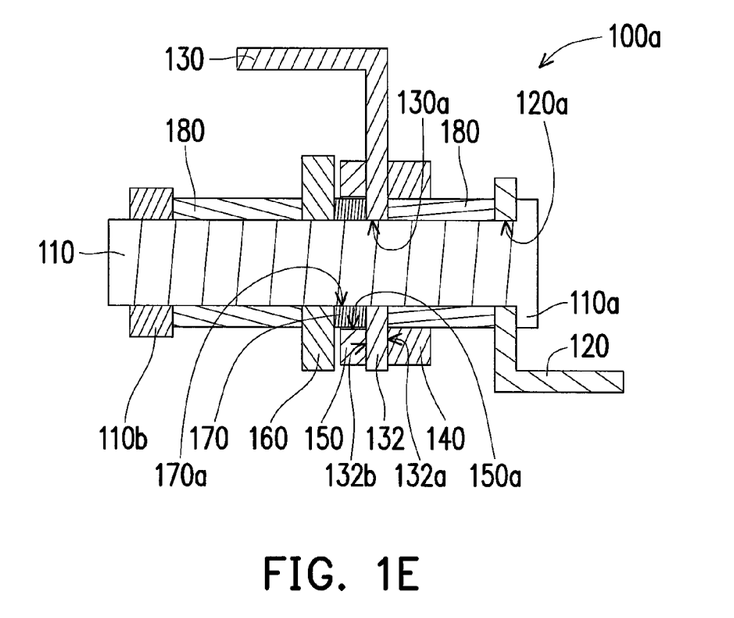
FIG. 1E is a sectional view of the hinge module depicted in FIG. 1A which is under pressing.

In the present embodiment, to be more specifically, the bearing 132 has the second shaft hole 130a to be passed through by the shaft 110 and located between the electromagnet 140 and the magnetic element 150, and the electromagnet 140 is capable of magnetically attracting the magnetic element 150 to move, so that the magnetic element 150 can press the second lateral side 132b of the bearing 132, so as to provide said effect of increasing the rotational friction, as shown in FIG. 1E.

In the present embodiment, the hinge module 100a can further include a restraint element 160 which is also fixed and passed through by the shaft 110, so that the magnetic element 150 is restricted to only move between the bearing 132 and the restraint element 160 (i.e., a distance between the bearing 132 and the restraint element 160 is greater than a thickness of the magnetic element 150). In case the electromagnet 140 is not working, the magnetic element 150 can be attached to the restraint element 160 at the second position without touching the bearing 132, so that the second bracket 132 can be rotated relative to the first bracket 120 with a basic torsion. More specifically, in case the electromagnet 140 is not working, the magnetic element 150 including a material having magnetizing ability can be attached to the restraint element 160 having magnetizing ability or magnetizability, as shown in FIG. 1D. For instance, the magnetic element 150 can be, for example, a metal element containing iron, and the restraint element 160 can be a magnet; or the magnetic element 150 can be a magnet, and the restraint element 160 can be a metal element containing iron or a magnet.

In the present embodiment, in order to prevent the magnetic element 150 from touching the bearing 132 in case the electromagnet 140 is not working, the hinge module 100a can further includes a spacer 170 having a shaft hole 170a to be fixed and passed through by the shaft 110, and the spacer 170 is sandwiched between the second bracket 130 and the restraint element 160, as shown in FIGS. 1C and 1D. An outside diameter of the spacer 170 is more preferably to be slightly smaller than a pore diameter of the through via 150a of the magnetic element 150, so that the magnetic element 150 can be telescoped outside the spacer 170, and to be moved axially on the spacer 170 in relative to the shaft 110, as shown in FIGS. 1D and 1E. Therefore, in case the electromagnet 140 is working, the electromagnet 140 magnetically attracts the magnetic element 150, so that the magnetic element 150 can press the bearing 132, as shown in FIG. 1E. In addition, in case the electromagnet 140 is not working, the magnetic element 150 can be magnetically attached to the restraint element 160 without touching the bearing 132, as shown in FIG. 1D.

Figure 1F:
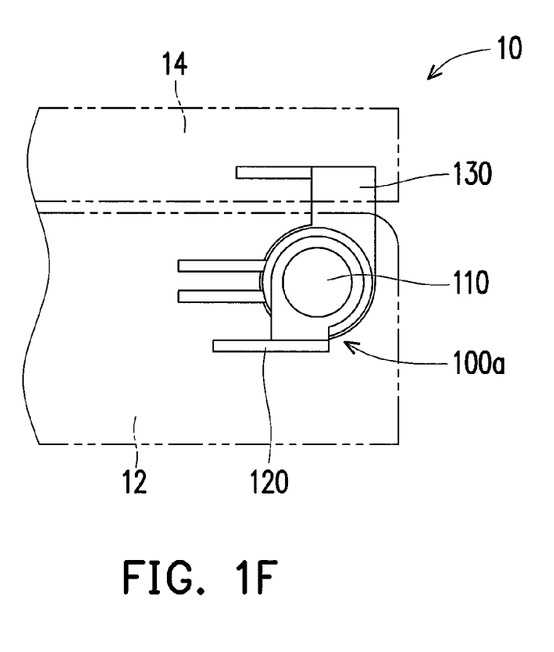
FIG. 1F is a side view illustrating the hinge module depicted in FIG. 1A being applied to the foldable device in a close state.

In the present embodiment, a plurality of methods can be utilized in order to restrict the magnetic element 150 to be only moved axially on the shaft 110 and between the second bracket 130 and the restraint element 160. For instance, the magnetic element 150 is directly or indirectly telescoped on the shaft 110 tightly through the through via 150a, or directly telescoped tightly on the spacer 170 fixed on the shaft 110. Alternately, as shown in another embodiment of FIG. 1H, the magnetic element 150 is fixed on the spacer 170 of the shaft (or directly on the shaft) so as to form an outer bevel surface 172, and an inner bevel surface 152 is correspondingly formed on an inner side of the through via 150a of the magnetic element 150, so that the magnetic element 150 can be moved axially when being restricted from rotating after being telescoped on the spacer 170 (or the shaft). However, methods for fixing the magnetic element 150 so it cannot be rotated are not limited to above. Adhesives, solders, or interference structures of any shape which can be used to disable the magnetic element 150 from rotating all fall in the scope as claimed in the invention.

In another embodiment, the electromagnet 140 can be fixed on the shaft 110 without being rotated along with the rotation of the second bracket 130, and can be further configured to move slightly and axially. As a result, when the electromagnet 140 is activated by power, the electromagnet 140 and the magnetic element 150 can be tightly attached to the first lateral side 132a and the second lateral side 132b of the bearing 132 of the second bracket 130, respectively, in a face-to-face fashion by utilizing the magnetic suction force, so as increase more of the rotational friction.

In the present embodiment, the hinge module 100a can further includes one or more hollow elastic piece tubes 180, and each of the elastic piece tubes 180 can be composed by one or more elastic washer. The elastic piece tubes 180 can press the bearing 132 by utilizing tight attachments of a head portion 110a of the shaft 110 and a nut 110b screwed to the shaft 110, so as to generate a basic torsion required for a rotation of the bearing 132 relative to the shaft 110. It should be noted that, the elastic piece tubes 180 can provide the torsion required for a rotation of the bearing 132 relative to the shaft 110, and together with the electromagnet 140 and the magnetic element 150, the torsion required for the rotation of the bearing 132 relative to the shaft 110 can be further increased.

Figure 1G:
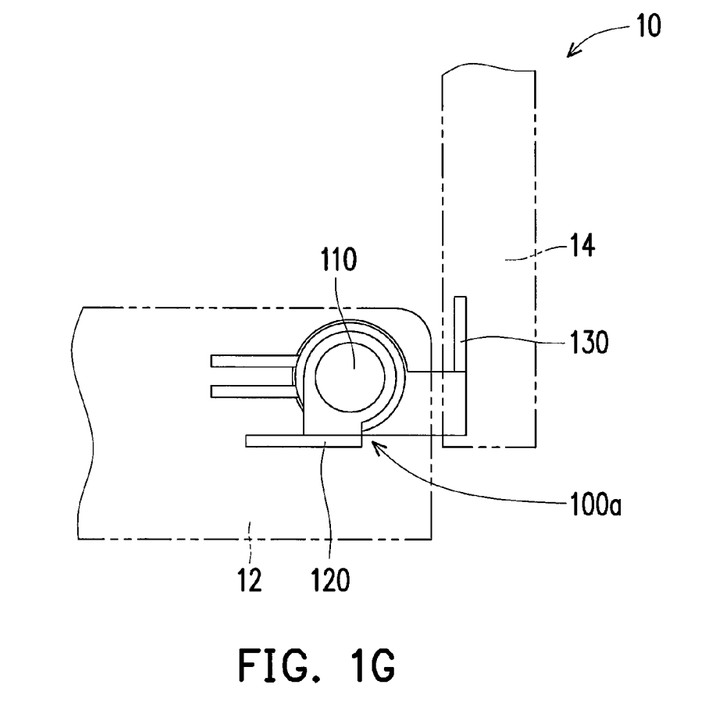
FIG. 1G is a side view illustrating the hinge module depicted in FIG. 1A being applied to the foldable device in an open state.
Figure 1H:
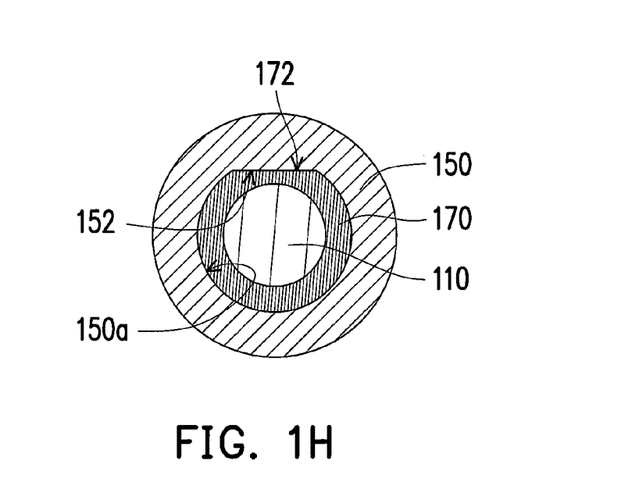
FIG. 1H is a radial section of a shaft, a magnetic element and a spacer in a hinge module according to another embodiment of the invention.

Referring to FIG. 1G, when the first body 12 and the second body 14 in the foldable device 10 are in use and opened to one specific included angle, in order to maintain a stability of the included angle between the first body 12 and the second body 14, the electromagnet 140 can be activated to generate a magnetic field to affect the magnetic element 150, so that the magnetic element 150 can press the second bracket 130 relative to the shaft 110, as shown in FIG. 1E. Accordingly, the torsion required for the rotation of the bearing 132 relative to the shaft 110 can be increased, thereby increasing the torsion required for the rotation of the second body 14 relative to the first body 12 as described in foregoing paragraphs and omitted herein.

In the embodiment of FIG. 1A, the shaft 132 of the second bracket 130 is located between the electromagnet 140 and the magnetic element 150, so that the magnetic element 150 can press the bearing 132 by utilizing the magnetic suction force between the electromagnet 140 and the magnetic element 150. However, referring to another embodiment of the invention of FIGS. 2A, 2B and 2C, in a hinge module 100b of the present embodiment, the magnetic element 150 is changed to be located between the bearing 132 of the second bracket 130 and the electromagnet 140, and a distance between the bearing 132 and the electromagnet 140 is greater than a thickness of the magnetic element 150 so that the magnetic element 150 can be moved axially to the first position which is close to the bearing 132, or to the second position which is far away from the bearing 132. A different between the present embodiment and the previous embodiment is that, when the electromagnet 140 is activated by power, the magnetic element 150 presses the first lateral side 132a of the bearing 132 in a face-to-face fashion by utilizing a magnetic repulsion force between the electromagnet 140 and the magnetic element 150, so as to provide the effect of increasing the rotational fraction. Also, methods for fixing the magnetic element 150 so it cannot be rotated are identical to those described in the previous embodiment, thus related description is omitted herein.

Figure 2A:
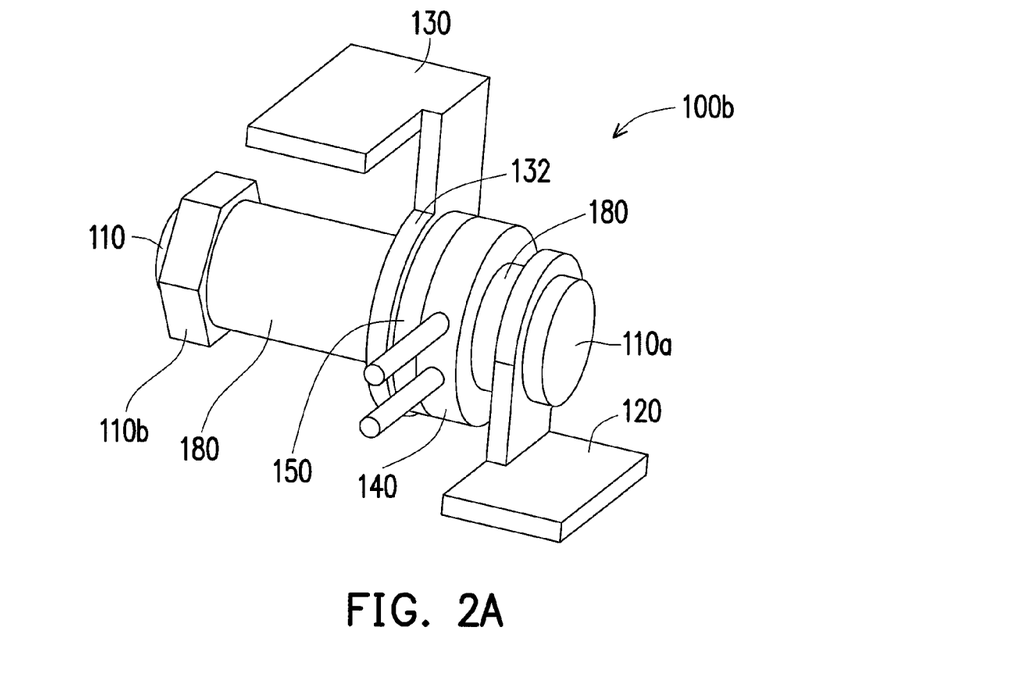
FIG. 2A is a three-dimensional view of a hinge module according to another embodiment of the invention.
Figure 2B:
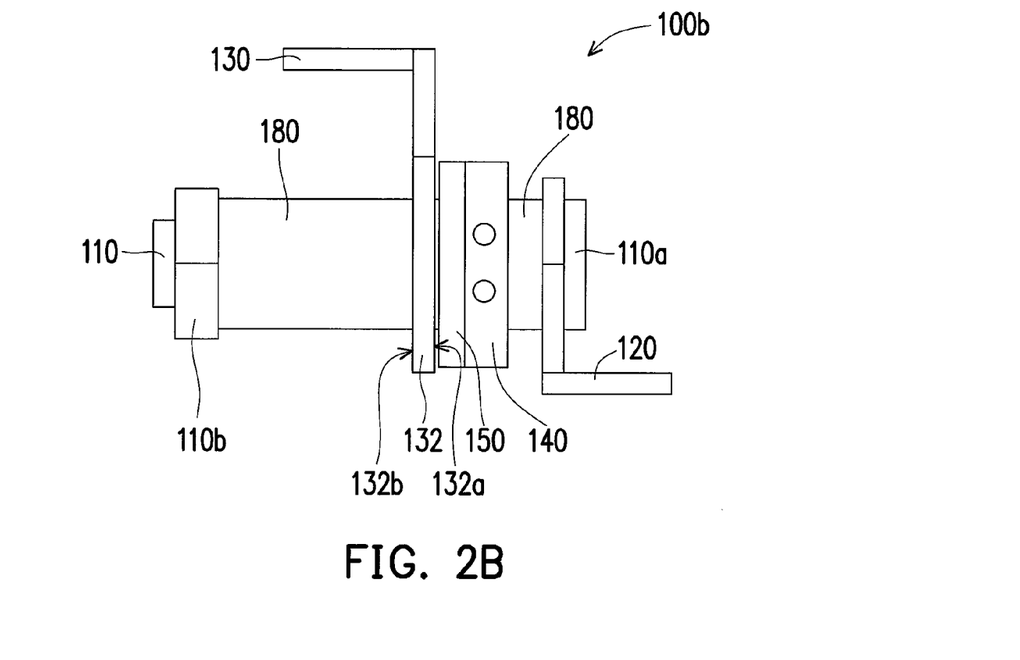
FIG. 2B is a front view of the hinge module depicted in FIG. 2A.
Figure 2C:
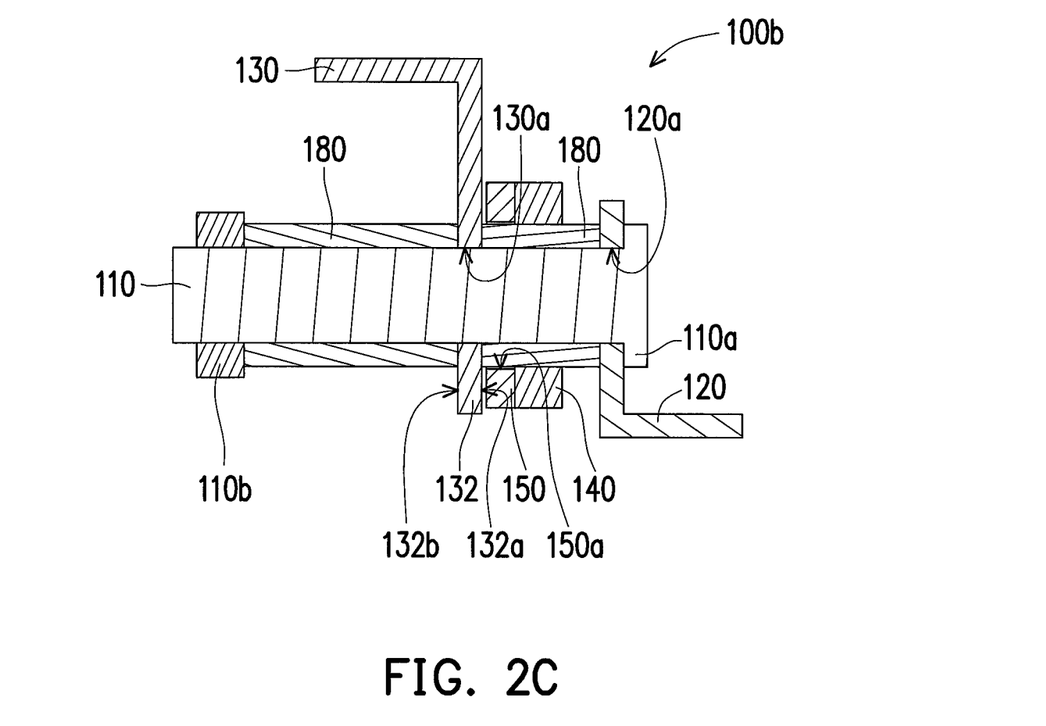
FIG. 2C is a sectional view of the hinge module depicted in FIG. 2A.

In all of embodiments of FIG. 1A, FIG. 2A and the following description, only differences between said embodiment are discussed, and same or similar reference numbers represent the same or similar elements. Accordingly, no further description thereof is provided.

Figure 3A:
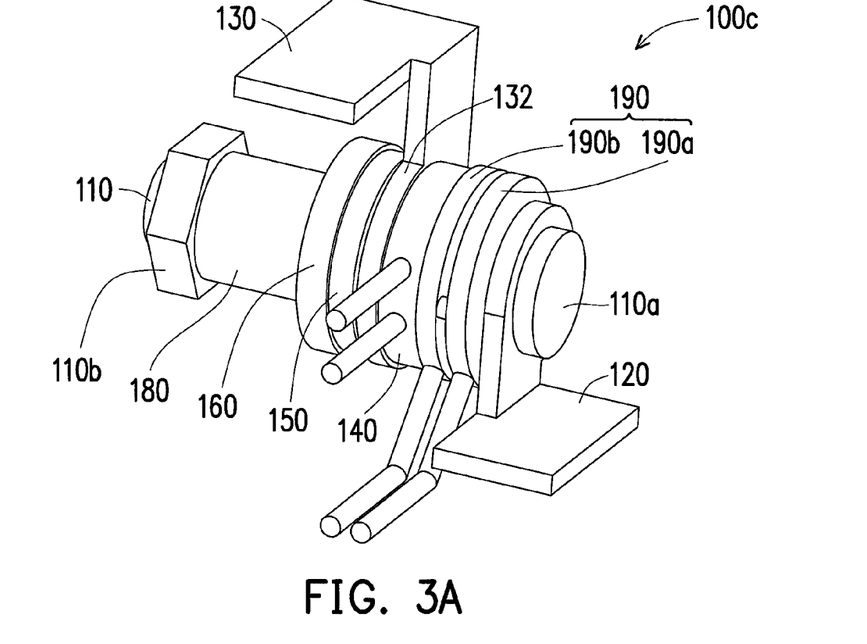
FIG. 3A is a three-dimensional view of a hinge module according to another embodiment of the invention.
Figure 3B:
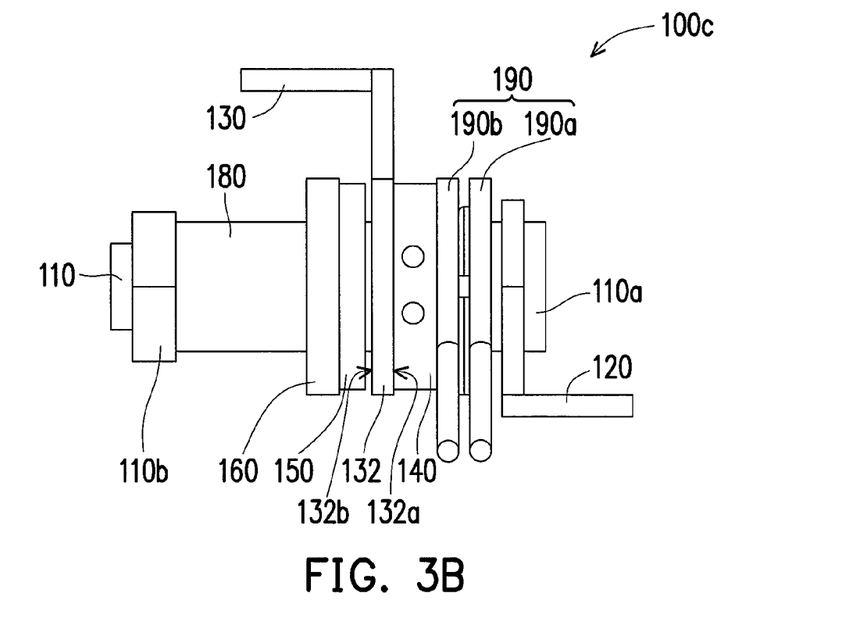
FIG. 3B is a front view of the hinge module depicted in FIG. 3A.
Figure 3C:
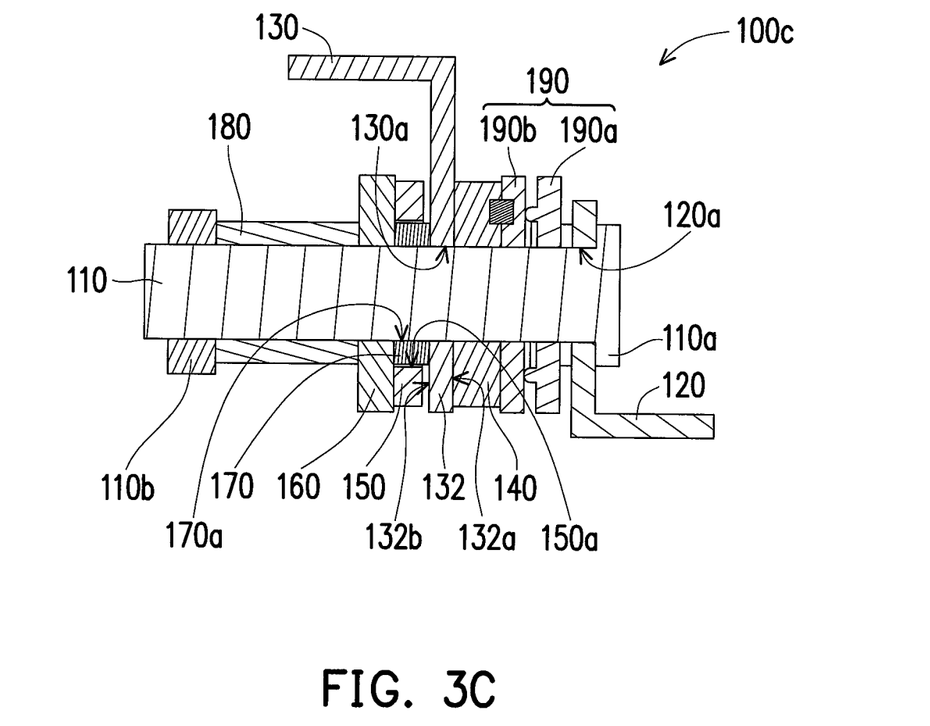
FIG. 3C is a sectional view of the hinge module depicted in FIG. 3A.

Referring to FIGS. 3A, 3B and 3C, in comparison with the hinge module 100a depicted in FIG. 1A, a hinge module 100c of the present embodiment further includes an angle detector for detecting an included angle between the first bracket 120 and the second bracket 130. The angle detector can be a variable resistor 190 including a fixing element 190a and a movable element 190b. The fixing element 190a is fixed on the shaft 110, and the movable element 190b is directly fixed on the bearing 132 of the second bracket 130, or indirectly fixed on the bearing 132 of the second bracket 130 through the electromagnet 140, so as to be rotated synchronously with the second bracket 130. Therefore, an included angle between the fixing element 190a and the movable element 190b (i.e., which is equivalent to the include angle between the first bracket 120 and the second bracket 130) can be obtained from a resistance value provided by the variable resistor 190. Therefore, the electromagnet 140 can be timely driven according to a variation of the include angle between the first body 12 and the second body 14 to generate the magnetic field, so as to affect the magnetic element 150 to press the second bracket 130, thereby increasing the torsion required for the rotation of the second bracket 130 relative to the first bracket 120. For instance, when the display of the second body 14 is opened to 120 degrees in relative to the host base of the first body 12, the electromagnet 140 is driven to start working as to increase the torsion of the display, so that the display can be maintained at the include angle without shaking when the user is performing a touch operation to the display with fingers.

Figure 4A:
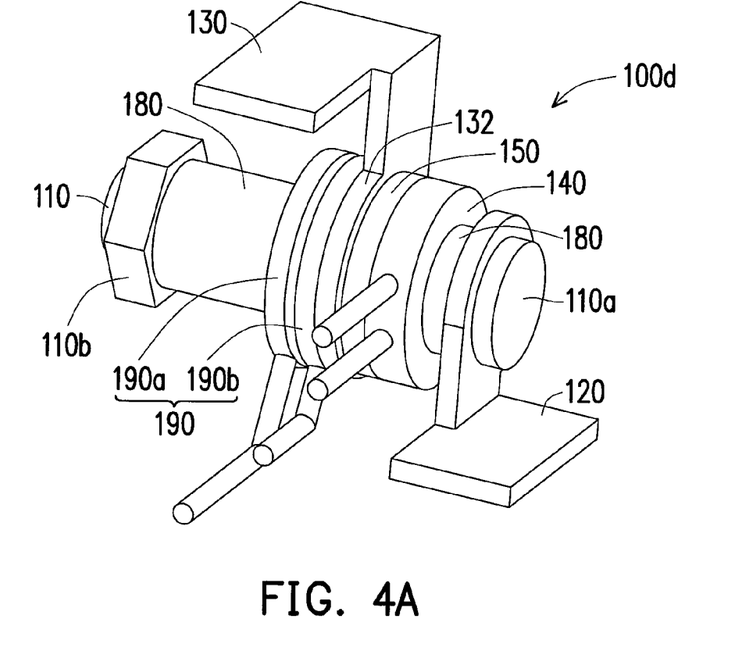
FIG. 4A is a three-dimensional view of a hinge module according to another embodiment of the invention.
Figure 4B:
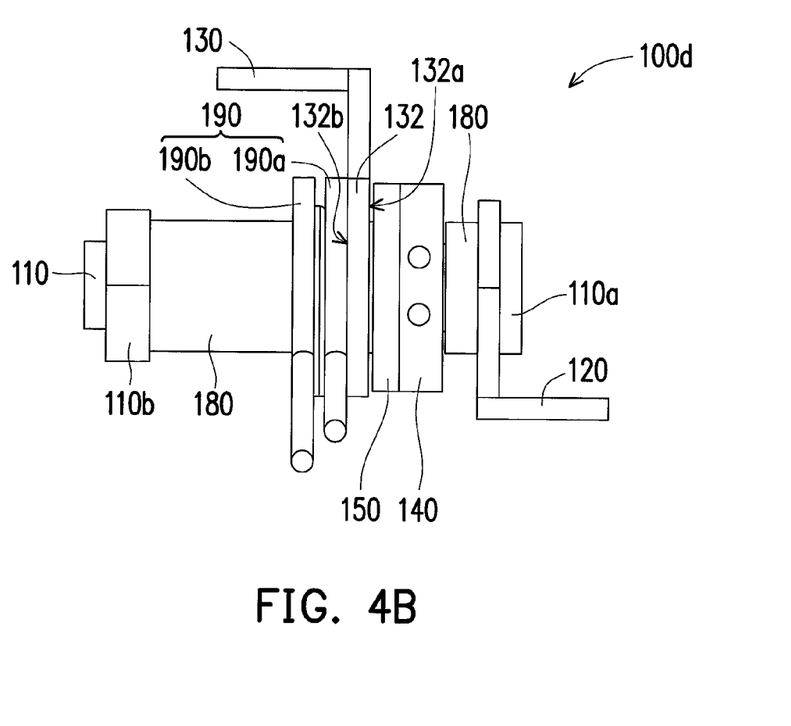
FIG. 4B is a front view of the hinge module depicted in FIG. 3A.
Figure 4C:
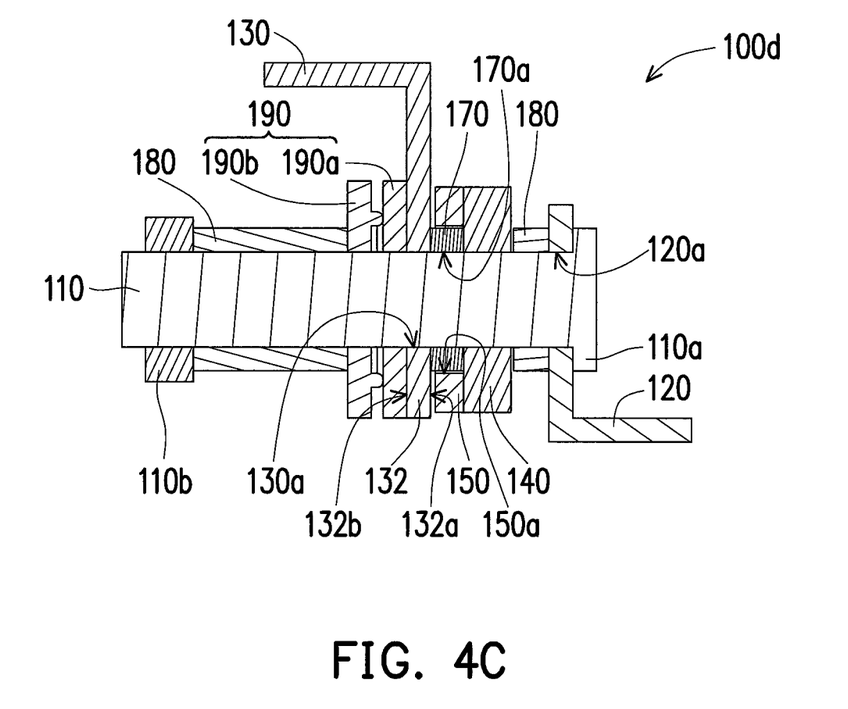
FIG. 4C is a sectional view of the hinge module depicted in FIG. 3A.

Referring to FIGS. 4A, 4B and 4C, in comparison with the hinge module 100b depicted in FIG. 2A, a hinge module 100d of the present embodiment further includes an angle detector including the variable resistor 190 depicted in FIGS. 3A to 3C of the previous embodiment for confirming the included angle between the first bracket 120 and the second bracket 130. The variable resistor 190 also includes the fixing element 190a and the movable element 190b. The fixing element 190a is fixed on the shaft 110, and the movable element 190b is directly or indirectly fixed on the bearing 132 of the second bracket 130 so as to be rotated synchronously with the second bracket 130. Therefore, the included angle between the first bracket 120 and the second bracket 130 can be obtained from the resistance value provided by the variable resistor 190. Therefore, an included angle between the fixing element 190a and the movable element 190b (i.e., which is equivalent to the include angle between the first bracket 120 and the second bracket 130) can be obtained from a resistance value provided by the variable resistor 190. Therefore, the electromagnet 140 can be timely driven according to a variation of the include angle between the first body 12 and the second body 14 to generate the magnetic field, so as to affect the magnetic element 150 to press the second bracket 130, thereby increasing the torsion required for the rotation of the second bracket 130 relative to the first bracket 120.

Figure 5:
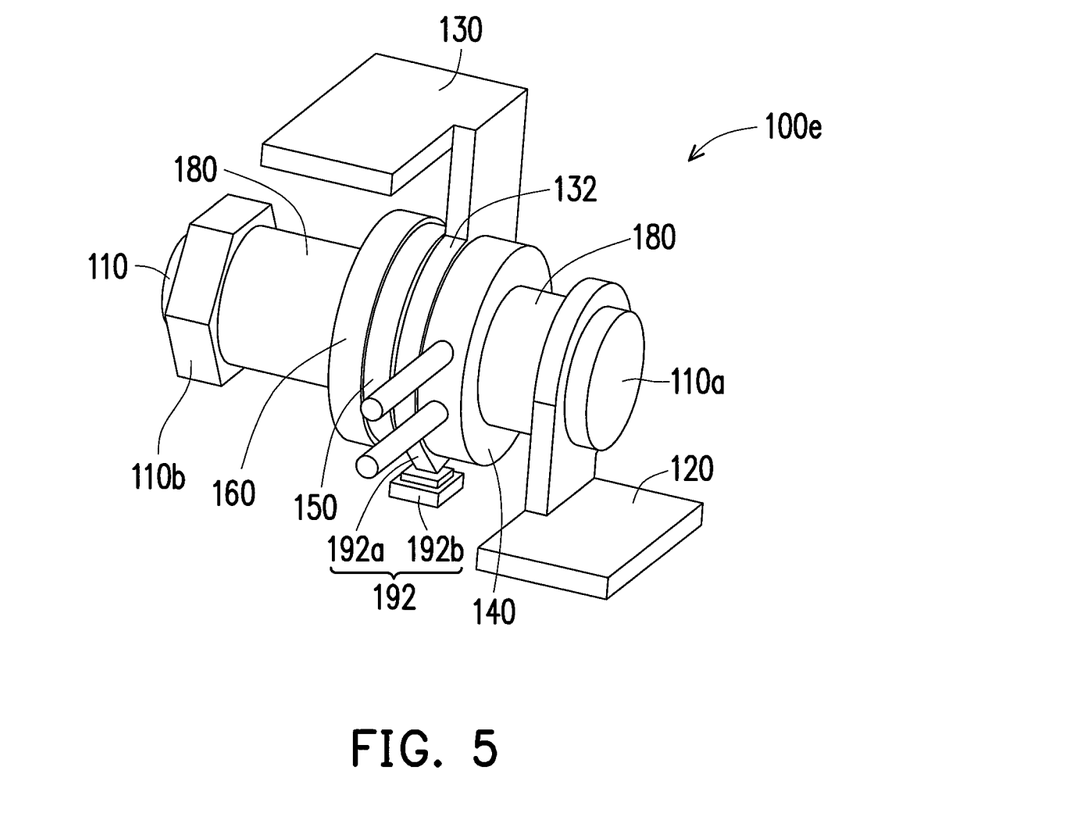
FIG. 5 is a three-dimensional view of a hinge module according to another embodiment of the invention.

In the embodiment of the FIG. 3A and the embodiment of FIG. 4A, the angle detector with the variable resistor 190 is utilized to obtain the variation of the include angle between the first body 12 and the second body 14 as depicted in FIG. 1F, and a control command can be generated according to the variation of the include angle between the first body 12 and the second body 14 thereby driving the electromagnet 140. However, referring to yet another embodiment of the invention in FIG. 5, a hinge module 100e of the present embodiment utilizes a triggering member 192 as the angle detector to obtain a result of whether the variation of the include angle between the first body 12 and the second body 14 is a preset angle or falls in a preset angle range, so that the control command can be generate correspondingly to drive the electromagnet 140. In the present embodiment, the triggering member 192 includes a triggering cam 192a and a triggering switch 192b. The triggering cam 192a is directly or indirectly fixed on the second bracket 130, so as to be rotated synchronously with the second bracket 130 in relative to the shaft 110, and the triggering switch 192a is fixed on a rotation path of the triggering cam 192a, so that the second bracket 130 is touched and pressed by the triggering cam 192a when rotating the second bracket 130 relative to the first bracket 120 to a preset angle, so that the control command is generated to drive the electromagnet 140.

The invention further provides a controlling method for the hinge module 100a depicted in FIG. 1A or hinge modules of other embodiments, it is explained hereinafter using the hinge module 100a depicted in FIG. 1A as an example. Referring to FIG. 1A, the controlling method includes driving the electromagnet 140 according to a control command to generate a magnetic field so as to affect the magnetic element 150 to press the second bracket 130 (e.g., the bearing 132) relative to the shaft 110, thereby adjusting a torsion required for a rotation of the second bracket 130 relative to the first bracket 120. The control command can be generated according a variation of an included angle between the first bracket 120 and the second bracket 130, such that the torsion required for the rotation of the second bracket 130 relative to the first bracket 120 can be adjusted according to the variation of the included angle between the first bracket 120 and the second bracket 130.

In the embodiment of the FIG. 3A and the embodiment of FIG. 4A, a resistance variation of the variable resistor 190 is utilized to obtain the include angle between the first bracket 120 and the second bracket 130, and a control command can be generated by a computer program of the foldable device 10 according to the include angle between the first body 120 and the second body 130, thereby driving the electromagnet 140. Further, in the embodiment of FIG. 5, the control command is generated to drive the electromagnet 140 according to whether the triggering switch 192b of the triggering member 192 is pressed by the triggering cam 192a.

In the foregoing embodiments of the invention, the electromagnet 140 can be further operated by using a control command. For instance, the control command includes a command for altering a current size provided to the electromagnet 140 so as to change a strength of the magnetic field generated by the electromagnet 140, thereby adjusting a strength for pressing the magnetic element 150 to the second bracket 130. Furthermore, the control command also includes a command for altering a current direction provided to the electromagnet 140 so as to change a direction of the magnetic field generated by the electromagnet 140, thereby controlling the electromagnet 140 to either press the second bracket 130, or move far away from the second bracket 130. Moreover, the control command can also be generated according to an included angle requested by the user through a software (e.g., a computer program) or a hardware (e.g., a button switch) of the foldable device 10, so as to drive the electromagnet 140.

In the foregoing embodiments, purpose of pressing the magnetic element 150 to the second bracket 130 is accomplished by having the electromagnet 140 being fixed while the magnetic element 150 is capable of being attracted or repelled with the electromagnet 140 under the magnetic force of the electromagnet 140. However, in other possible embodiments, a design having the magnetic element 150 being fixed while the electromagnet 140 is capable of being moved axially, that is, when the electromagnet 140 is activated by power, the magnetic element 150 can be moved to press the second bracket 130 by utilizing of the magnetic suction force and the magnetic repulsion force of the electromagnet 140. In a more extreme embodiment, the electromagnet 140 and the magnetic element 150 can both be moved axially, so that the electromagnet 140 and the magnetic element 150 can be respectively pressed to two sides of the second bracket 130 as to tightly clamp the second bracket 130 by utilizing the magnetic suction force generated by the electromagnet 140. But no matter how, the one pressed on the second bracket 130 needs to be substantially incapable of being rotated, so that the friction of the second bracket 130 can be increased.

In summary, a combination of the electromagnet and the magnetic element is utilized in the invention for pressing the second bracket relative to the first bracket, so as to increase the torque required for the rotation of the second bracket relative to the first bracket. Further, in the invention, the electromagnet is driven by electricity to solve the wear behavior of the cam structure in conventional art. Furthermore, in the invention, the electromagnet can be driven according to the variation of the included angle between the first bracket and the second bracket, or the requirement of the user, so as to press the magnetic element to the second bracket (e.g., the bearing of the second bracket). Moreover, in the invention, the control command can also be generated according to any included angle requested by the user through a software (e.g., a computer program) or a hardware (e.g., a button switch) of the foldable device, so as to drive the electromagnet. Accordingly, when being applied to a foldable electronic device having a touch screen, such as notebook computers, transformer tablet computers or mobile phones, the stability of the angle of the touch screen is ensured when the touch screen is touched by the user.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A hinge module adapted to be disposed between a first body and a second body to facilitate in rotating the second body relative to the first body, and the hinge module comprises:
   a shaft;
   a first bracket fixed on the first body and fixedly supporting the shaft;
   a second bracket fixed on the second body and rotatably passed through by the shaft, for rotating the second bracket relative to the first bracket;
   an electromagnet directly or indirectly installed on the shaft; and
   a magnetic element directly or indirectly installed on the shaft, and attracted to or repelled by the electromagnet under the magnetic force of the electromagnet;
   wherein at least one of the electromagnet and the magnetic element is movable axially along the shaft but not rotatable with the shaft as an axis, and in response to the force of the electromagnet being activated by electric power, at least one of the electromagnet and the magnetic element is moved axially to a first position and presses the second bracket to increase a rotational friction, and thereby a torsion required for a rotation of the second bracket relative to the first bracket is increased,
   wherein the second bracket has a bearing to be passed through by the shaft, the bearing includes a first lateral side and a second lateral side opposite to each other, the electromagnet is installed adjacent to the first lateral side and incapable of being moved axially, the magnetic element is installed on the shaft adjacent to the second lateral side and capable of being moved axially, and the electromagnet generates a magnetic attraction force to attract the magnetic element so as to move the magnetic element to the first position to press the second lateral side of the bearing.

2. A hinge module adapted to be disposed between a first body and a second body to facilitate in rotating the second body relative to the first body, and the hinge module comprises:
   a shaft;
   a first bracket fixed on the first body and to fixedly supporting the shaft;
   a second bracket fixed on the second body and rotatably passed through by the shaft, for rotating the second bracket relative to the first bracket;

an electromagnet directly or indirectly installed on the shaft; and
a magnetic element directly or indirectly installed on the shaft, and attracted to or repelled by the electromagnet under the magnetic force of the electromagnet;
wherein at least one of the electromagnet and the magnetic element is movable axially along the shaft but not rotatable with the shaft as an axis, and in response to the force of the electromagnet being activated by electric power, at least one of the electromagnet and the magnetic element is moved axially to a first position and presses the second bracket to increase a rotational friction, and thereby a torsion required for a rotation of the second bracket relative to the first bracket is increased,
wherein the second bracket has a bearing rotatably passed through by the shaft, the bearing includes a first lateral side and a second lateral side opposite to each other, the electromagnet is installed adjacent to the first lateral side and incapable of being moved axially, the magnetic element is installed on the shaft and between the electromagnet and the second bracket and capable of being moved axially, and the electromagnet generates a magnetic repulsion force to repel the magnetic element so as to move the magnetic element to the first position to press the first lateral side of the bearing.

3. The hinge module of claim 1, further comprising:
a restraint element capable of generating a magnetic attraction force with the magnetic element, which is fixed on the shaft and spaced apart from the bearing by a distance greater than a thickness of the magnetic element, so that the magnetic element is capable of being moved axially between the bearing and the restraint element, and magnetically attached to the restraint element without touching the bearing in case the electromagnet is not working.

4. The hinge module of claim 3, further comprising:
a spacer fixed on the shaft and sandwiched between the bearing and the restraint element so the magnetic element is capable being moved axially on the spacer.

5. The hinge module of claim 1, further comprising:
a bearing located on the second bracket, and passed through by the shaft; and
an elastic piece tube telescoped on the shaft and maintained in pressing at least one side of the bearing, so as to generate a basic torsion of the rotation of second bracket relative to the first bracket.

6. The hinge module of claim 4, wherein the magnetic element has an inner bevel surface, and an outer bevel surface formed on the spacer or the shaft within a range of axial movement of the magnetic element, so that the magnetic element is capable of being moved axially when the magnetic element is restricted from rotating with the shaft as the axis after being installed on the spacer or the shaft.

7. The hinge module of claim 1, further comprising an angle detector adapted to detect an included angle between the second bracket and the first bracket.

8. The hinge module of claim 7, wherein the angle detector includes a variable resistor, and the variable resistor further includes a fixing element and a movable element, the fixing element is directly and indirectly fixed on the shaft, and the movable element is directly or indirectly fixed on the second bracket so as to be rotated synchronously with the second bracket, so that the included angle between the second bracket and the first bracket is correspondingly obtained through a variation of resistance values obtained when rotating the movable element relative to the fixing element.

9. The hinge module of claim 7, wherein the angle detector includes a triggering member, and the triggering member further includes a triggering cam and a triggering switch capable of driving the electromagnet, the triggering cam is directly or indirectly fixed on the second bracket so as to be rotated synchronously with the second bracket in relative to the shaft, and the triggering switch is fixed on a rotation path of the triggering cam, so that the second bracket is touched and pressed by the triggering cam when rotating the second bracket relative to the first bracket to a preset angle, thereby driving the electromagnet.

10. The hinge module of claim 1, wherein the electromagnet is controlled by a control command, and the control command includes at least one of commands for driving the electromagnet, controlling a current size, or altering a magnetic field direction of the electromagnet.

11. A foldable device, comprising:
a first body;
a second body; and
a hinge module disposed between the first body and the second body to facilitate rotation of the second body relative to the first body, and the hinge module comprises:
a shaft;
a first bracket fixed on the first body and fixedly supporting the shaft;
a second bracket fixed on the second body and rotatably passed through by the shaft, for rotating the second bracket relative to the first bracket;
an electromagnet directly or indirectly installed on the shaft; and
a magnetic element directly or indirectly installed on the shaft, and attracted or repelled with the electromagnet under the magnetic force of the electromagnet;
wherein at least one of the electromagnet and the magnetic element is movable axially along the shaft but not rotatable with the shaft as an axis, and in response to the force of the electromagnet activated by electric power, at least one of the electromagnet and the magnetic element is moved axially to a first position and presses the second bracket to increase a rotational friction, thereby a torsion required for a rotation of the second bracket relative to the first bracket is increased,
wherein the second bracket has a bearing to be passed through by the shaft, the bearing includes a first lateral side and a second lateral side opposite to each other, the electromagnet is installed adjacent to the first lateral side and incapable of being moved axially, the magnetic element is installed on the shaft adjacent to the second lateral side and capable of being moved axially; and the electromagnet generates a magnetic attraction force to attract the magnetic element so as to move the magnetic element to the first position to press the second lateral side of the bearing.

12. A foldable device, comprising:
a first body;
a second body; and
a hinge module disposed between the first body and the second body to facilitate rotation of the second body relative to the first body, and the hinge module comprises:
a shaft;
a first bracket fixed on the first body and fixedly supporting the shaft;
a second bracket fixed on the second body and rotatably passed through by the shaft, for rotating the second bracket relative to the first bracket;
an electromagnet directly or indirectly installed on the shaft; and a magnetic element directly or indirectly installed on the shaft, and attracted or repelled with the electromagnet under the magnetic force of the electromagnet;

wherein at least one of the electromagnet and the magnetic element is movable axially along the shaft but not rotatable with the shaft as an axis, and in response to the force of the electromagnet activated by electric power, at least one of the electromagnet and the magnetic element is moved axially to a first position presses the second bracket to increase a rotational friction, thereby a torsion required for a rotation of the second bracket relative to the first bracket is increased, wherein the second bracket has a bearing to be passed through by the shaft, the bearing includes a first lateral side and a second lateral side opposite to each other, the electromagnet is installed adjacent to the first lateral side and incapable of being moved axially, the magnetic element is installed on the shaft adjacent to the second lateral side and capable of being moved axially; and the electromagnet generates a magnetic repulsion force to repel the magnetic element so as to move the magnetic element to the first position to press the first lateral side of the bearing.

13. The foldable device of claim 11, further comprising: a restraint element capable of generating a magnetic suction force with the magnetic element, which is fixed on the shaft and spaced apart from the bearing with a distance greater than a thickness of the magnetic element, so that the magnetic element is capable of being moved axially between the bearing and the restraint element, and magnetically attached to the restraint element without touching the bearing in case the electromagnet is not working.

14. The foldable device of claim 13, further comprising: a spacer fixed on the shaft and sandwiched between the bearing and the restraint element so the magnetic element is capable being moved axially on the spacer.

15. The foldable device of claim 11, further comprising: a bearing located on the second bracket, and passed through by the shaft; and
an elastic piece tube telescoped on the shaft and maintained in pressing at least one side of the bearing, so as to generate a basic torsion of the rotation of second bracket relative to the first bracket.

16. The foldable device of claim 14, wherein the magnetic element has an inner bevel surface, and an outer bevel surface formed on the spacer or the shaft within a range of axial movement of the magnetic element, so that the magnetic element is capable of being moved axially when the magnetic element is restricted from rotating with the shaft as the axis after being installed on the spacer or the shaft.

17. The foldable device of claim 11, further comprising an angle detector adapted to detect an included angle between the second bracket and the first bracket.

18. The foldable device of claim 17, wherein the angle detector includes a variable resistor, and the variable resistor further includes a fixing element and a movable element, the fixing element is directly and indirectly fixed on the shaft, and the movable element is directly or indirectly fixed on the second bracket so as to be rotated synchronously with the second bracket, so that the included angle between the second bracket and the first bracket is correspondingly obtained through a variation of resistance values obtained when rotating the movable element relative to the fixing element.

19. The foldable device of claim 17, wherein the angle detector includes a triggering member, and the triggering member further includes a triggering cam and a triggering switch capable of driving the electromagnet, the triggering cam is directly or indirectly fixed on the second bracket so as to be rotated synchronously with the second bracket in relative to the shaft, and the triggering switch is fixed on a rotation path of the triggering cam, so that the second bracket is touched and pressed by the triggering cam when rotating the second bracket relative to the first bracket to a preset angle, thereby driving the electromagnet.

20. The foldable device of claim 11, wherein the electromagnet is controlled by a control command, and the control command includes at least one of commands for driving the electromagnet, controlling a current size, or altering a magnetic field direction of the electromagnet.

21. The foldable device of claim 11, wherein the first body is a host base of a notebook computer, and the second body is a display of the notebook computer.

22. The hinge module of claim 2, further comprising:
a bearing located on the second bracket, and passed through by the shaft; and
an elastic piece tube telescoped on the shaft and maintained in pressing at least one side of the bearing, so as to generate a basic torsion of the rotation of second bracket relative to the first bracket.

23. The hinge module of claim 2, further comprising an angle detector adapted to detect an included angle between the second bracket and the first bracket.

24. The hinge module of claim 23, wherein the angle detector includes a variable resistor, and the variable resistor further includes a fixing element and a movable element, the fixing element is directly and indirectly fixed on the shaft, and the movable element is directly or indirectly fixed on the second bracket so as to be rotated synchronously with the second bracket, so that the included angle between the second bracket and the first bracket is correspondingly obtained through a variation of resistance values obtained when rotating the movable element relative to the fixing element.

25. The hinge module of claim 23, wherein the angle detector includes a triggering member, and the triggering member further includes a triggering cam and a triggering switch capable of driving the electromagnet, the triggering cam is directly or indirectly fixed on the second bracket so as to be rotated synchronously with the second bracket in relative to the shaft, and the triggering switch is fixed on a rotation path of the triggering cam, so that the second bracket is touched and pressed by the triggering cam when rotating the second bracket relative to the first bracket to a preset angle, thereby driving the electromagnet.

26. The hinge module of claim 2, wherein the electromagnet is controlled by a control command, and the control command includes at least one of commands for driving the electromagnet, controlling a current size, or altering a magnetic field direction of the electromagnet.

27. The foldable device of claim 12, further comprising:
a bearing located on the second bracket, and passed through by the shaft; and
an elastic piece tube telescoped on the shaft and maintained in pressing at least one side of the bearing, so as to generate a basic torsion of the rotation of second bracket relative to the first bracket.

28. The foldable device of claim 12, further comprising an angle detector adapted to detect an included angle between the second bracket and the first bracket.

29. The foldable device of claim 28, wherein the angle detector includes a variable resistor, and the variable resistor further includes a fixing element and a movable element, the fixing element is directly and indirectly fixed on the shaft, and the movable element is directly or indirectly fixed on the second bracket so as to be rotated synchronously with the second bracket, so that the included angle between the second bracket and the first bracket is correspondingly obtained through a variation of resistance values obtained when rotating the movable element relative to the fixing element.

30. The foldable device of claim 28, wherein the angle detector includes a triggering member, and the triggering member further includes a triggering cam and a triggering switch capable of driving the electromagnet, the triggering cam is directly or indirectly fixed on the second bracket so as to be rotated synchronously with the second bracket in relative to the shaft, and the triggering switch is fixed on a rotation path of the triggering cam, so that the second bracket is touched and pressed by the triggering cam when rotating the second bracket relative to the first bracket to a preset angle, thereby driving the electromagnet.

31. The foldable device of claim 12, wherein the electromagnet is controlled by a control command, and the control command includes at least one of commands for driving the electromagnet, controlling a current size, or altering a magnetic field direction of the electromagnet.

32. The foldable device of claim 12, wherein the first body is a host base of a notebook computer, and the second body is a display of the notebook computer.

* * * * *